(12) United States Patent
Humby et al.

(10) Patent No.: US 9,773,005 B2
(45) Date of Patent: Sep. 26, 2017

(54) POLYMORPHIC APPLICATION OF POLICY

(71) Applicant: EMC Corporation, Hopkinton, MA (US)

(72) Inventors: David Humby, Richmond (CA); John-David Dorman, Ottawa (CA); Steve Sauder, Ottawa (CA); Fiona Schrader, Ottawa (CA); Dan Taillefer, Ottawa (CA)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 14/997,779

(22) Filed: Jan. 18, 2016

(65) Prior Publication Data
US 2016/0259798 A1 Sep. 8, 2016

Related U.S. Application Data

(63) Continuation of application No. 13/435,987, filed on Mar. 30, 2012, now Pat. No. 9,268,916.

(51) Int. Cl.
*G06F 17/00* (2006.01)
*G06F 17/30* (2006.01)
*G06F 21/00* (2013.01)
*G06F 21/62* (2013.01)

(52) U.S. Cl.
CPC ........ *G06F 17/30085* (2013.01); *G06F 21/00* (2013.01); *G06F 21/6218* (2013.01)

(58) Field of Classification Search
CPC .... G06F 9/4435; G06F 17/30607; G06F 8/20; G06F 9/443; G06F 9/465
See application file for complete search history.

(56) References Cited

U.S. PATENT DOCUMENTS

| 7,594,082 B1 * | 9/2009 | Kilday | G06Q 10/107 711/154 |
| 2012/0221811 A1 * | 8/2012 | Sparkes | G06F 17/30085 711/159 |

* cited by examiner

*Primary Examiner* — Truong Vo
(74) *Attorney, Agent, or Firm* — Van Pelt, Yi & James LLP

(57) ABSTRACT

Polymorphic application of a policy is disclosed. An indication is received that a retention policy is to be applied with respect to an object. A rule is evaluated associated with the retention policy, in light of a circumstance of the object, to determine a manner in which the retention policy is to be configured to behave with respect to the object.

20 Claims, 4 Drawing Sheets

POLYMORPHIC APPLICATION OF POLICY

CROSS REFERENCE TO OTHER APPLICATIONS

This application is a continuation of co-pending U.S. patent application Ser. No. 13/435,987, entitled POLYMORPHIC APPLICATION OF POLICY filed Mar. 30, 2012 which is incorporated herein by reference for all purposes.

BACKGROUND OF THE INVENTION

Records management and other content management applications and systems have been provided to automate the process of managing objects and/or records in accordance with applicable legal, business, or other requirements, for example Sarbanes-Oxley Act requirements or Department of Defense requirements. Control over a "policy" and governing of one or more of the creation, organization, storage, access, naming, marking, retention, security, and disposition of an object are among the aspects of records management that typical records management and content management applications and systems provide.

The application of a policy involves an administrator to craft and/or describe the policy. Typically more than one policy is crafted for different objects, for example they may have different aging rules. Administering all these different policies creates complexity for the administrator, introduces error, for example through the misapplication of a policy to an object, and increases resource overhead.

BRIEF DESCRIPTION OF THE DRAWINGS

Various embodiments of the invention are disclosed in the following detailed description and the accompanying drawings.

DETAILED DESCRIPTION

Figure 1:
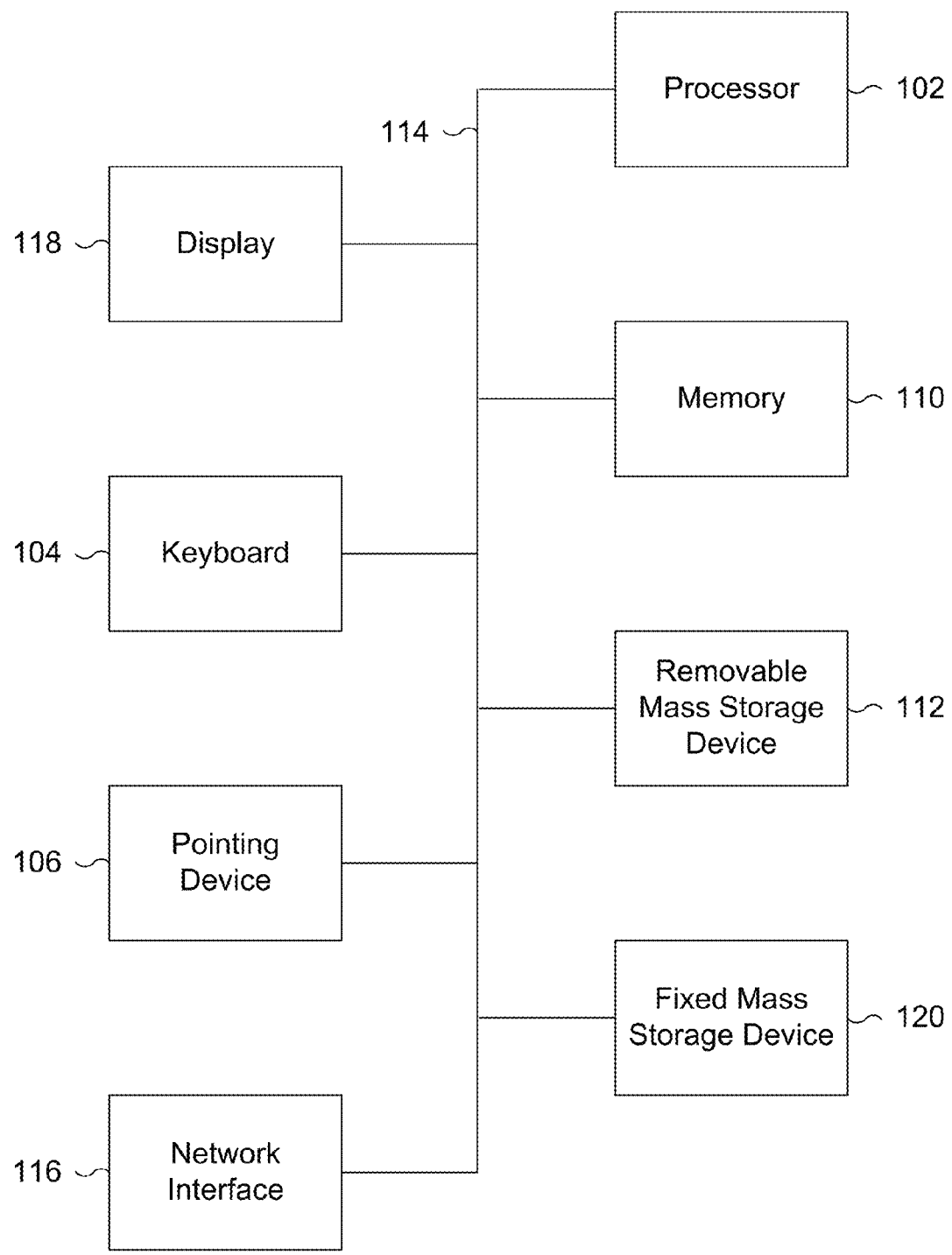
FIG. 1 is a functional diagram illustrating a programmed computer system for distributed workflows in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Polymorphic application of a policy is disclosed. In some embodiments, a single policy is crafted such that it has different effects on different objects, primarily that the behavior of the single policy differs based on the object type that the policy is applied to and/or events that occur to the object or its associated objects. Throughout this specification "object" generally refers to any computing entity, including an object-oriented object with bound data and methods as termed in object-oriented programming ("OOP") frameworks/languages, but also to values, variables, functions, data structures, database structures, records, content, file system entities (e.g., files, links, and folders), etc. By associating a single policy with, for example, a container or folder structure, the policy itself describes behavior based on object type, rather than the typical scenario of an administrator creating different policies for different folders and relying on the user and/or system to put a file in an appropriate filesystem folder to enforce a specific behavior.

An example for a retention policy is that a single retention policy may be applied to a folder in which an aging pattern is prescribed for all objects in the folder. For a specific document type, for example a financial document, the aging term is three years, whereas for other document types, the aging term is five years. Applying a single policy to the folder is convenient and less error-prone for an administrator. Another example is the application of a security policy, wherein a single security policy through polymorphic application may provide different protection (e.g., ACLs) to different objects of different types, for example financial documents, Top Secret documents, PDF files, and/or Word files.

Applying a policy to objects based on object type and/or other circumstances is disclosed, improving upon the typical scenario where a user's workflow must accommodate, for example, one or more imposed folders, each with an associated policy. That is, instead of a user having to remember that folder A is for tax documents and folder B is for classified documents and storing documents based on that folder structure, the user is free to store documents in any folder under a root folder. The single policy is associated with the root folder and through polymorphic application in the root folder and its subfolders, recognizes a tax document through circumstances and applies a tax policy to it, and if a classified document is in the same folder, applies a classified policy to it.

FIG. 1 is a functional diagram illustrating a programmed computer system for distributed workflows in accordance with some embodiments. As shown, FIG. 1 provides a functional diagram of a general purpose computer system programmed to execute workflows in accordance with some embodiments. As will be apparent, other computer system architectures and configurations can be used to execute workflows. Computer system 100, which includes various subsystems as described below, includes at least one microprocessor subsystem, also referred to as a processor or a central processing unit ("CPU") 102. For example, processor 102 can be implemented by a single-chip processor or by multiple cores and/or processors. In some embodiments, processor 102 is a general purpose digital processor that controls the operation of the computer system 100. Using instructions retrieved from memory 110, the processor 102 controls the reception and manipulation of input data, and the output and display of data on output devices, for example display 118.

Processor 102 is coupled bi-directionally with memory 110, which can include a first primary storage, typically a random access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as well known in the art, primary storage typically includes basic operating instructions, program code, data and objects used by the processor 102 to perform its functions, for example programmed instructions. For example, primary storage devices 110 can include any suitable computer-readable storage media, described below, depending on whether, for example, data access needs to be bi-directional or uni-directional. For example, processor 102 can also directly and very rapidly retrieve and store frequently needed data in a cache memory, not shown.

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storage 112, 120 can be incorporated, if needed, in standard fashion as part of primary storage 110, for example RAM, as virtual memory.

In addition to providing processor 102 access to storage subsystems, bus 114 can be used to provide access to other subsystems and devices as well. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Throughout this specification "network" refers to any interconnection between computer components including the Internet, Ethernet, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, WiFi, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. Additional mass storage devices, not shown, can also be connected to processor 102 through network interface 116.

An auxiliary I/O device interface, not shown, can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits ("ASIC" s), programmable logic devices ("PLD" s), and ROM and RAM devices. Examples of program code include both machine code, as produced, for example, by a compiler, or files containing higher level code, for example a script, that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
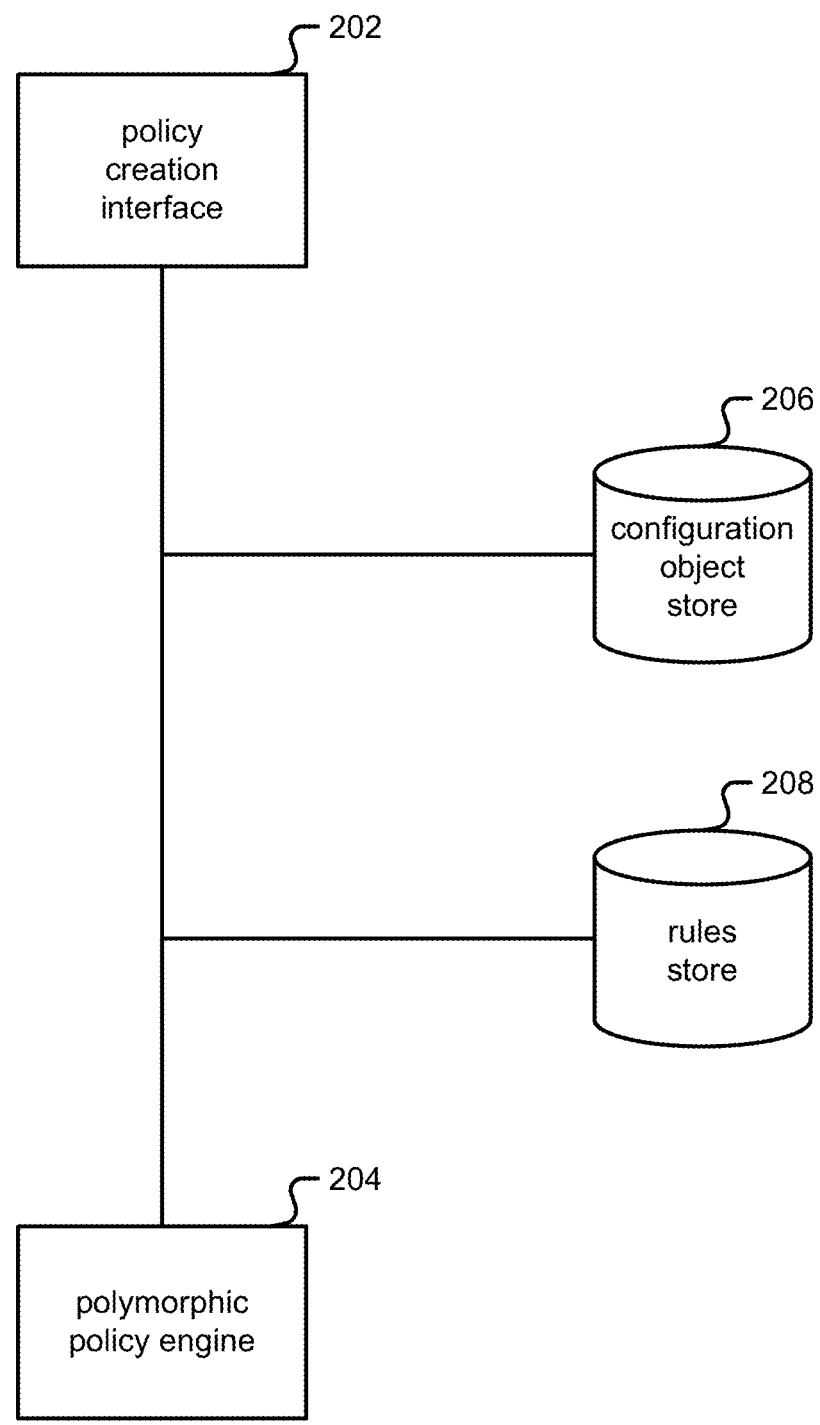
FIG. 2 is a block diagram illustrating an embodiment of a system for polymorphic application of policy.

FIG. 2 is a block diagram illustrating an embodiment of a system for polymorphic application of policy.

In the example shown, policy creation interface 202 is coupled to polymorphic policy engine 204, configuration object store 206, and rules store 208. Policy creation interface 202 provides: an administrative user a user interface; an application an application interface; and/or a developer an application programming interface ("API") to create a policy, in part by associating rules from rules store 208. Rules may include predefined rules that are object-type-based, attribute-based and/or event-based. Rules may also include custom rules, themselves created with a rules creation interface (not shown.) After the policy has been created, it is stored as a "configuration object" in configuration object store 206.

The configuration object is applied/associated with an object, for example a folder structure. The polymorphic policy engine 204 monitors the folder structure and listens. As events occur, the engine 204 determines the type of retention to be applied to an object associated with the event.

In some embodiments, when applying retention to one or more retention policies of an object, the type of retention that is applied to the object can depend on the various rules that are either associated to the policy or to the object itself. The policy application can be either exclusionary or inclusionary. That is, the rules can exclude the policy being applied to the object as well as include a policy to apply to the object. The same object can have different policies applied/excluded depending on different "circumstances" the object is currently associated with.

Examples of circumstances comprise:
- metadata "attributes", including the value of metadata; and which metadata attributes have been associated to the object (i.e., aspect attributes/traits);
- content of the object, for example depending on the values of the content, this may determine what aging method is applied. E.g. determining if the content is a Financial document will get a different aging than a document that is about HR functions;
- determine what the disposition strategy of the document is (e.g. export and then destroy the object) based at least upon what folder the documents is linked into;
- what process the object is currently undergoing or has completed; and
- other policies that have been applied to the object.

Examples of metadata attributes that could be used to determine what type of aging method, disposition strategy, etc. will be applied to the object include:
- The user that is the owner of the object. E.g. If the user is in a specific group one would keep the document for 7 years;
- When the document becomes approved (e.g. metadata element Approved is set) then a different disposition strategy is used;
- Folder passes its active state. When a metadata element moves into an active state is when the retention and protection is applied to objects within the folder.

Figure 3:
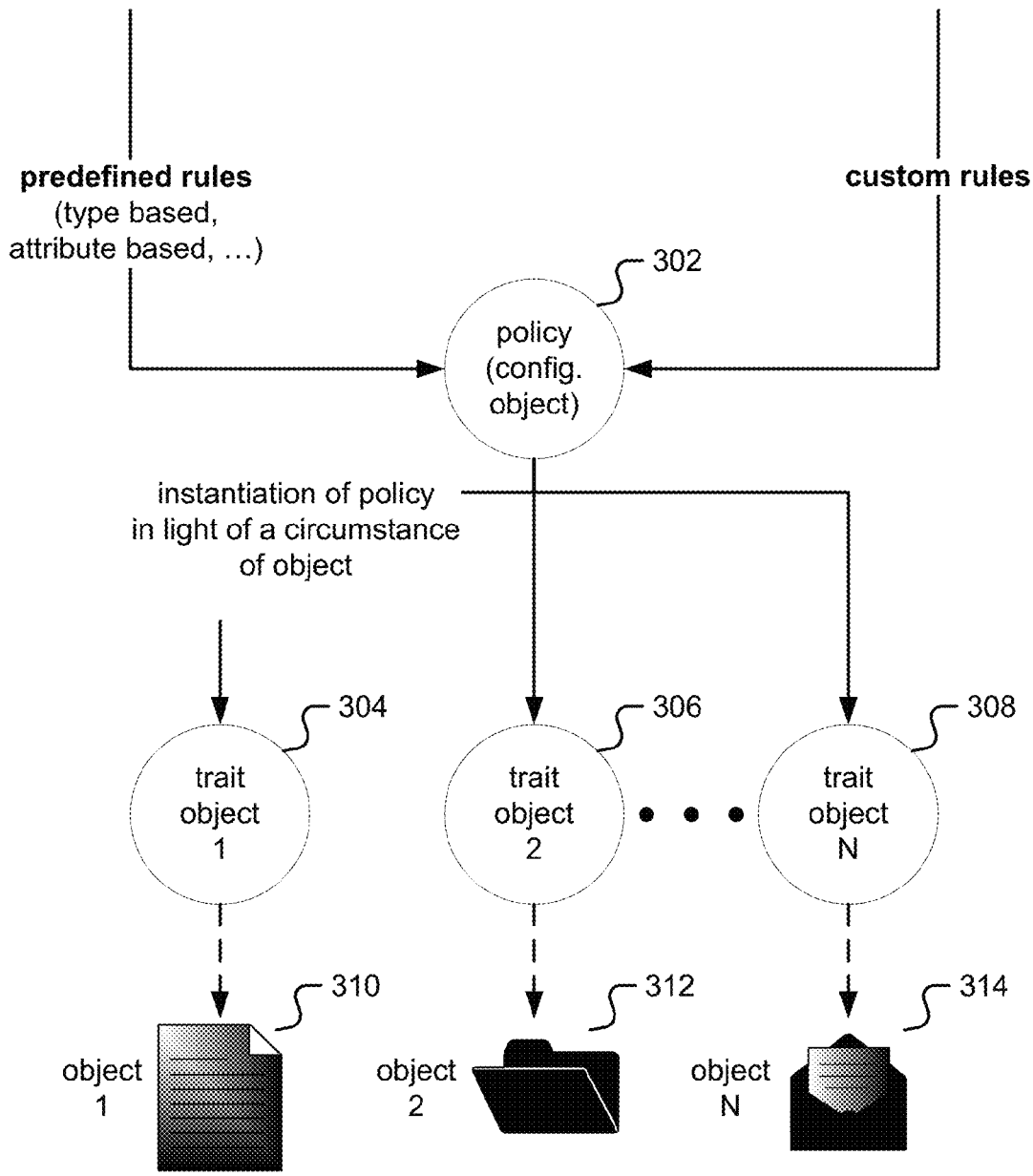
FIG. 3 is a diagram illustrating an embodiment of a relationship between policy, trait and filesystem.

FIG. 3 is a diagram illustrating an embodiment of a relationship between policy, trait and filesystem. In some embodiments, the relationship depicted in FIG. 3 is reflected in the system of FIG. 2.

With policy creation interface 202 a policy 302 is created using predefined rules and/or custom rules and stored as a configuration object in store 206. These rules, stored in rules store 208, determine, based on the characteristics of the policy and the circumstances of the object at the time of determination, whether the policy will or will not be applied to the object. Events can determine when the rules are evaluated on an object. A process can also be instituted to invoke the rules on a scheduled basis to re-evaluate the objects to determine if the circumstances have changed and a policy change is required.

The rules within the policy can determine which parts of the policy apply depending on the circumstances of the object, for example: aging pattern, events, disposition strategy, and hierarchy strategy. Rules as part of the object can be used to determine which policy to apply, and then when the policy is applied, the rules within the policy can determine what parts of the policy apply to the object. The rules can also have default behavior if the evaluation of the rules does not resolve to the application of retention.

Some case examples of rules include:

Working Papers are Treated Differently than Normal Records

By nature objects like working papers do not have retention yet. There is no protection but they still age and are destroyed after a certain period of time/expiration policy. If working papers exist after a certain amount of time but have not been converted to record, then they are destroyed after a prescribed amount of time. This may mean that it has no use to the organization.

Some Folders do not Inherit the Policy of their Parent.

The policy is propagated but not enforced. The policy may be applied to the folder but no rules allowing for any aging method, disposition, etc. are enforced. This allows for policies to skip a level (i.e. there is no retention or disposition) but still apply the hierarchical rules of the policy.

Declassified Records.

Moving records from Classified to declassified are treated differently. If a document is declassified, the aging rule, protection and disposition strategies will be different.

Box

In a box or any other container, object uses the rules of the box instead of rules for the object, such that:

There is a different aging method; and

Documents in a box age differently than if it is in a folder in the box.

Case Management

Generally, sub-folders and documents are treated as a single unit. All objects in a hierarchy (e.g. a Case) have the same aging methods, disposition and hierarchy rules. However, there can be exceptions for individual documents in the case.

Rule Propagation

The rules may propagate to the children of virtual documents. A rule can be different for the parent of a virtual document than the children of the virtual document.

Renditions

A rule can exclude the renditions of a document from aging or disposition.

Metadata Immutability

Protects the metadata from being changed. For example, this could apply to documents not folders.

Broker Dealers

Example of rules for a broker/dealer might include:

If a user is a broker/dealer, associated documents are kept for minimum of 7 years If a user is not a broker dealer, then rules based on the type of document determines the age.

Throughout this specification an "event" is defined as any logged or unlogged occurrence from the existing records management system or content management system ("CMS"). For example, moving a file from one container to another container may trigger an event within the CMS.

Examples of an event include:

Something happens to an object (e.g. date value based on aging changes) so the aging is recalculated based on the new value of an attribute. A document has a new date applied to it. The rule is to recalculate if changes are made to the date and a new disposition date is calculated;

A working paper is converted to a record. When a working paper is converted to a normal document, the protection is now applied and a different aging method is used. In one case working papers age for 30 days but normal documents are now kept for 3 years; and A folder being closed starts aging. When a folder is closed, all documents in the system start to age that have been protected up to this point but have not started to age. Once the close event is triggered, document will start to age based on rules associated to the policy for each of the documents in the folder.

Policies are instantiated in light of a circumstance of an object. These instantiated policies are termed "trait objects," for example a trait object 1 (304) may be instantiated in light of a circumstance of object 1, a document type (310), a trait object 2 (306) may be instantiated in light of a circumstance of object 2, a folder type (312), and/or a trait object N (308) may be instantiated in light of a circumstance of object N, a message type (314).

The trait object is an implementation of how one associates retention to an object. In some embodiments retainer object and aspects are used to show the implementation of retention on an object. A trait may be similar but implemented differently as an instance of the retention that is applied to the object. In some embodiments the trait object is a different implementation of the same concept of aspect/retainer implementations.

Figure 4:
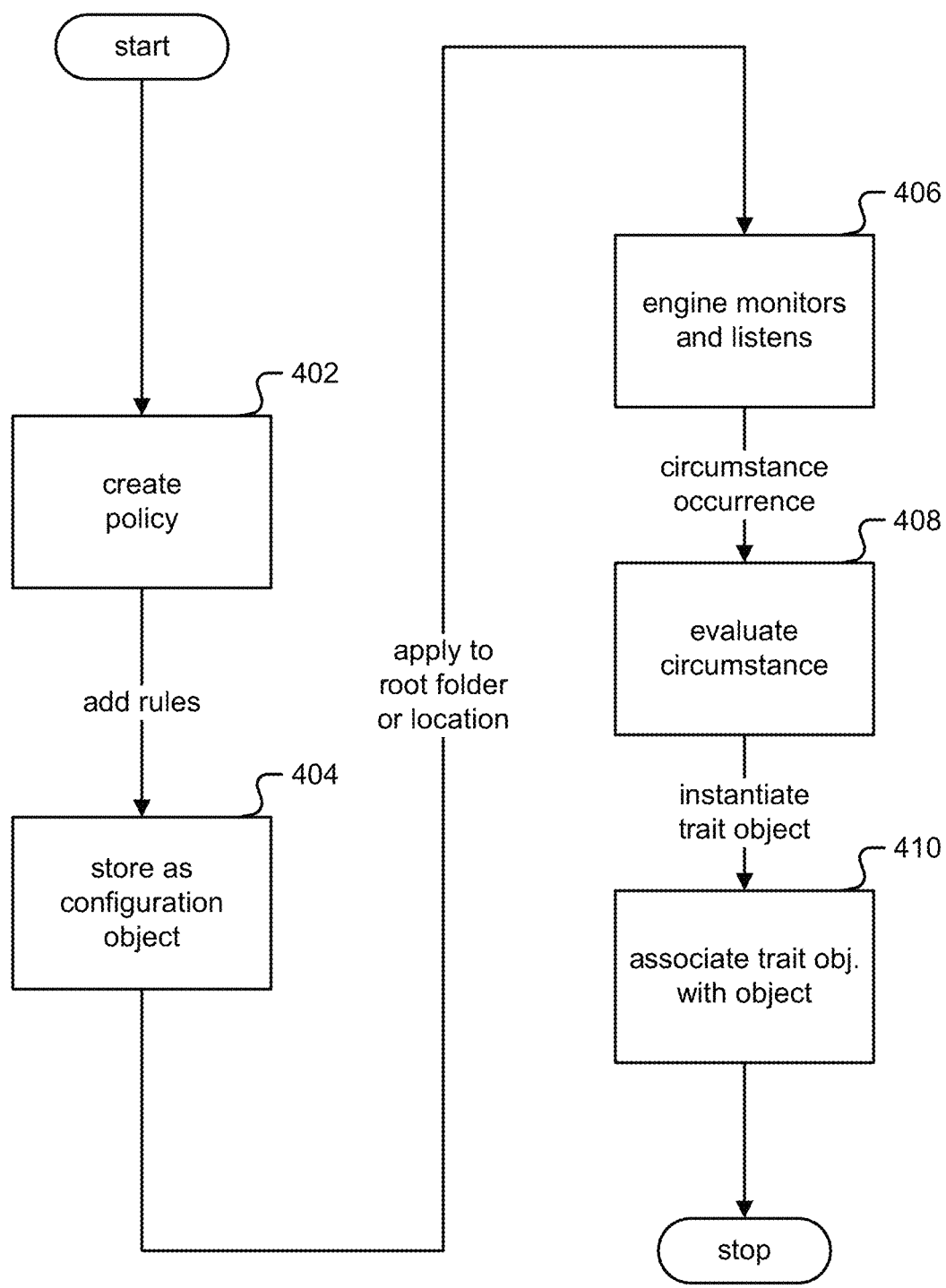
FIG. 4 is a flow chart illustrating an embodiment of a process for polymorphic application of policy.

FIG. 4 is a flow chart illustrating an embodiment of a process for polymorphic application of policy. In some embodiments, the process of FIG. 4 is carried out by the system in FIG. 2, for example interface 202 and engine 204.

In step 402, the policy is created. For example, a retention policy may be created with an administrator user interface wherein a palette of rules is presented to the administrative user. The administrator selects applicable rules, including predefined, custom and/or arbitrary rules. The rules may be previously stored in rules store 208 or be defined at the time of creation and subsequently stored in rules store 208.

In step 404, the policy is defined by its rules and stored as a configuration object in configuration object store 206. The single policy or configuration object is then applied to a root folder or location. In step 406 the polymorphic policy engine 204 monitors and listens to the root folder and its subsequent folders, waiting either for a circumstance occurrence or a change in the policy/configuration object itself. In the event the policy/configuration object changes, the engine 204 reevaluates the changes in rules, for example by triggering a circumstance occurrence in all the affected objects.

In step 408, the engine evaluates the circumstance, in part by reviewing the current rules of the policy/configuration object. A trait object is instantiated with a subset of the rules relevant to a specific object associated with the triggered circumstance, and in step 410 the trait object is associated with the specific object. Different rules may be applied at different times; for example a disposition rule may be applied at the time of application (e.g., the circumstance occurrence) and/or it may be applied at the time of scheduled disposition.

Polymorphic Application: An Example

An example of polymorphic application is as follows. A policy is created that has the following rules:
1. For user documents, no protection is applied for the documents and aging is set for 3 years, after which the document is disposed and/or destroyed.
2. For folders, all documents in the folder age for 3 years and subsequently, the folder is disposed and all contents disposed and/or destroyed.
3. For a bin, bay and shelf in a warehouse, no protection, no aging or disposition is applied.
4. For a box:
   a. All documents in a box will be protected, age for 5 years based on the box creation date, then be disposed (there is to be a confirmation before destruction), and a certificate of destruction will be provided; and
   b. All folders in the box will be protected, age for 5 years based on the box creation date, then be disposed (there is to be a confirmation before destruction), and a certificate of destruction will be provided.

The policy is applied at an upper level folder A. A warehouse structure is created under folder A for physical objects:

Scenario One

A user structure is created under folder A. Document X is put in User Folder 1:

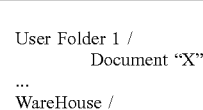

Document X then based on rules is given No protection and Aging 3 years from creation date (Jan. 2, 2012), projected disposition at Jan. 2, 2015)

Scenario Two

Box A contains the following:

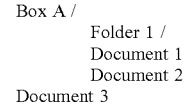

Box A is put on Shelf 1 in the WareHouse. All documents in the box are thus: Protected, and granted Aging for 5 years from the box creation date (Feb. 5, 2011) and projected disposition of Feb. 5, 2016).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A method, comprising:
receiving an indication that a retention policy is to be polymorphically applied with respect to a folder;
wherein the polymorphically applied retention policy comprises a single retention policy providing different retention to different objects of different types, wherein different retention includes at least one of the follow- ing: differing aging methods, different disposition strategies, different protection strategies, and differing hierarchical rules;
monitoring the folder;
listening for events to occur; and
after an event occurs, determining a type of retention of the single retention policy to be applied to an object associated with the event based at least in part on a circumstance of the object, wherein the circumstance of the object includes at least one of the following: metadata attributes of the object, content of the object, and processes associated with the object.

2. The method of claim 1, wherein determining comprises determining one or both of an extent to which and a manner in which a retention related requirement associated with the polymorphically applied retention policy is to be fulfilled with respect to the object.

3. The method of claim 1, further comprising creating an instance of the polymorphically applied retention policy.

4. The method of claim 3, wherein the instance is a trait object.

5. The method of claim 3, further comprising:
applying the instance with the object based at least in part on the rule.

6. The method as recited in claim 5, wherein the rule as part of the object can be used to determine which polymorphically applied retention policy to apply.

7. The method as recited in claim 6, wherein when the polymorphic retention policy is applied, the rule within the polymorphically applied retention policy can determine what parts of the polymorphic retention policy apply to the object.

8. The method of claim 1, further comprising:
excluding an instance of the polymorphically applied retention policy from being applied to the object based at least in part on the rule.

9. The method of claim 1, further comprising:
receiving an indication that an event has occurred; and determining a time to reevaluate the rule based at least in part on the event.

10. The method of claim 1, further comprising:
determining a time to reevaluate the rule based at least in part on a determination that the rule is on a scheduled basis.

11. The method of claim 1, wherein the object may be associated with a second instance associated with a second circumstance.

12. The method of claim 1, wherein the second circumstance includes one or more of the following:
1) metadata attributes, including a value of metadata, which attributes have been associated with the object, which aspect attributes have been associated with the object, and which trait objects have been associated with the object;
2) what process the object is currently undergoing;
3) what process the object has completed; and
4) other policies that have been applied to the object.

13. The method of claim 12, wherein the metadata attributes include one or more of the following:
1) an owner of the object;
2) an approval element of the object; and
3) an active state of the object.

14. The method of claim 1, wherein the rule includes one or more of the following:
1) a specific rule to determine an aging pattern;
2) a specific rule to determine an event;
3) a specific rule to determine a disposition strategy; and
4) a specific rule to determine a hierarchy strategy.

15. The method as recited in claim 1, wherein the rule has a default behavior if the evaluation of the rule does not resolve to an application of retention.

16. The method as recited in claim 1, wherein the type of retention that is applied to the object depends on the rule by association with the polymorphically applied retention policy or with the object.

17. A system, comprising:
a processor; and
a memory coupled with the processor, wherein the memory is configured to provide the processor with instructions which when executed cause the processor to:
receive an indication that a polymorphic retention policy is to be polymorphically applied with respect to a folder;
wherein the polymorphically applied retention policy comprises a single retention policy providing different retention to different objects of different types, wherein different retention includes at least one of the following: differing aging methods different disposition strategies different protection strategies, and differing hierarchical rules;
monitor the folder;
listen for events to occur; and
after an event occurs, determine a type of retention of the single retention policy to be applied to an object associated with the event based at least in part on a circumstance of the object, wherein the circumstance of the object includes at least one of the following: metadata attributes of the object, content of the object, and processes associated with the object.

18. The system recited in claim 17, wherein determining comprises determining one or both of an extent to which and a manner in which a retention related requirement associated with the polymorphically applied retention policy is to be fulfilled with respect to the object.

19. A computer program product, the computer program product being embodied in a tangible computer readable storage medium and comprising computer instructions for:
receiving an indication that a retention policy is to be polymorphically applied with respect to a folder;
wherein the polymorphically applied retention policy comprises a single retention policy providing different retention to different objects of different types, wherein different retention includes at least one of the following: differing aging methods, different disposition strategies, different protection strategies, and differing hierarchical rules;
monitoring the folder;
listening for events to occur; and
after an event occurs, determining a type of retention of the single retention policy to be applied to an object associated with the event based at least in part on a circumstance of the object, wherein the circumstance of the object includes at least one of the following: metadata attributes of the object, content of the object, and processes associated with the object.

20. The computer program product recited in claim 19, wherein determining comprises determining one or both of an extent to which and a manner in which a retention related requirement associated with the polymorphically applied retention policy is to be fulfilled with respect to the object.

* * * * *